United States Patent [19]

Seurin

[11] 4,442,008
[45] Apr. 10, 1984

[54] PROCESS FOR PURIFYING THE ACTIVE LIQUID WITHIN HYDRAULIC CONTROL CIRCUITS

[75] Inventor: Georges J. C. Seurin, Izon, France

[73] Assignee: Avions Marcel Dassault-Breguet Aviation, Vaucresson, France

[21] Appl. No.: 369,089

[22] Filed: Apr. 16, 1982

[30] Foreign Application Priority Data

Apr. 17, 1981 [FR] France ................................ 81 07770

[51] Int. Cl.³ ........................................... B01D 15/00
[52] U.S. Cl. .................................... 210/683; 210/805; 210/167
[58] Field of Search ............... 210/681, 683, 767, 805, 210/167, 168, 435, 493.1, 493.4, 494.1, 497.01, 757, 765

[56] References Cited

U.S. PATENT DOCUMENTS

| | | | |
|---|---|---|---|
| 3,591,010 | 7/1971 | Pall et al. | 210/493.1 |
| 4,039,457 | 8/1977 | Schacht et al. | 210/493.4 |
| 4,302,335 | 11/1981 | Habermas | 210/167 |

FOREIGN PATENT DOCUMENTS 613166 7/1935 Fed. Rep. of Germany .

Primary Examiner—Ivars C. Cintins
Attorney, Agent, or Firm—Watson, Cole, Grindle & Watson

[57] ABSTRACT

In order to absorb ions and corrosive products which accumulate in a hydraulic circuit during its operation, particularly a hydraulic circuit in an aircraft which operates to control the operation of the aircraft, a solid material is disposed within the liquid which circulates through the circuit which is capable of chemically fixing these ions or products at its surface. The solid material may comprise a corrodible grade of iron and it may be in the form of a type of sieve.

6 Claims, 5 Drawing Figures

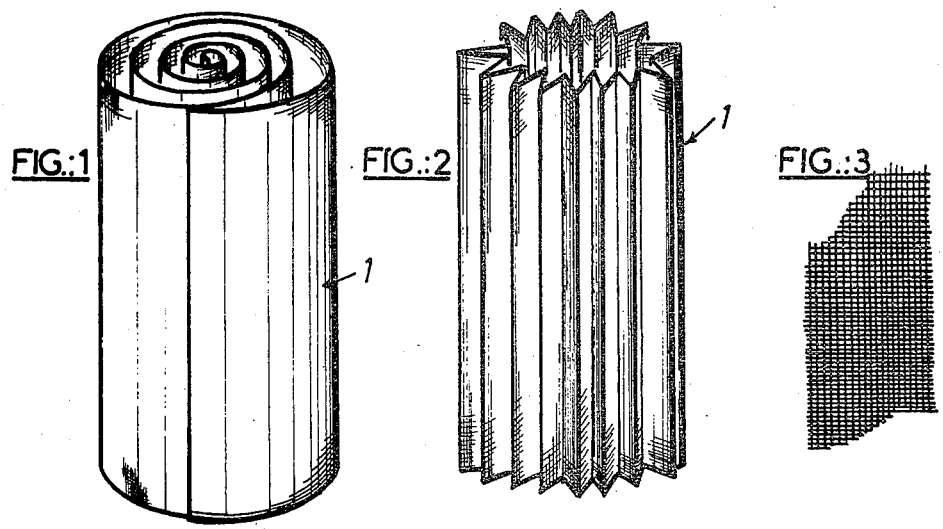
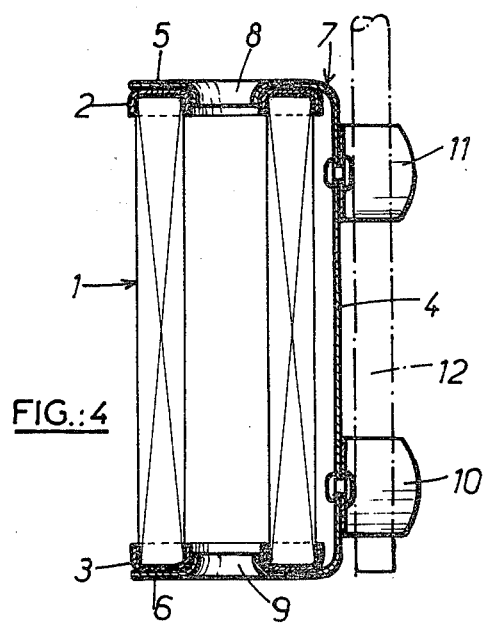
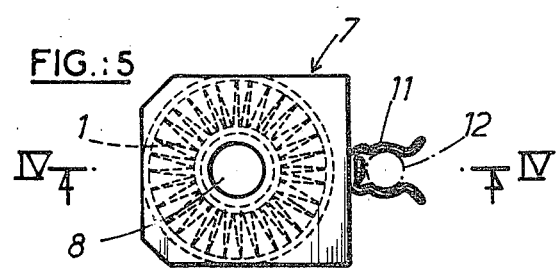

PROCESS FOR PURIFYING THE ACTIVE LIQUID WITHIN HYDRAULIC CONTROL CIRCUITS

BACKGROUND OF THE INVENTION

This invention relates to a process and device for purifying the active liquid within hydraulic control circuits.

In the manufacture of hydraulic control circuits which are operated by remote control, such as those used in aircraft, maximum reliability and safety in operation must naturally be sought. This is the reason why such circuits are often employed in duplicate, i.e., so that one can be substituted for another in case of a breakdown.

The presence of corrosive ions or ionic groups in the active liquid, in particular, chlorine or fluorine ions, or hydrochloric acid, presents a particular problem, however. These ions generally result from the chlorous or fluorous solvents, such as trichlorethylene and particularly trichlorethane, which are used for the cleaning of hydraulic circuits by personnel handling aircraft or in maintenance workshops during inspection, despite the fact that use of these solvents is expressly forbidden by the manufacturers.

The traces of solvent which are thus formed in the liquid are more or less dissipated, particularly by the heat which is produced during operation, for example in the annular covers of servo-control valves where the shearing effect can be very great and causes a very high thermal increase locally, or in the pump which pressurizes the liquid. The corrosive ions which are released, however, in time attack the metal of the main parts of the circuit, such as the control valves, thus jeopardizing the operation and safety of the entire circuit.

Even an aircraft which has not had its hydraulic circuit contaminated by the use of the above-noted solvents, can have its hydraulic circuits polluted by being serviced in a maintenance workshop where an aircraft with contaminated control circuits has previously been serviced.

The carelessness of certain users can therefore jeopardize the safety even of aircraft which have been handled in a careful manner.

The applicants have considered this sensitive problem and have found a solution which is very simple to put into practice.

SUMMARY OF THE INVENTION

According to the invention there is provided a process for the automatic purification of the active liquid within a closed loop hydraulic control circuit wherein ions and corrosive products are absorbed, as and when they are released in operation of the hydraulic circuit, by means of a solid trap material which is disposed within the liquid (the trap material is insoluble in the liquid of the circuit) and which is capable of chemically fixing the corrosive ions or products at its surface.

This trap material can be a weak alloy of iron which will fix chlorine, fluorine or HCl by forming chloride or fluoride at its surface, the chlorine or fluorine content of the liquid thus being decreased.

By replacing the trap material used at convenient intervals, the corrosive ions can be immobilized.

Preferably this trap material is immersed in the liquid in the feed and return tank or reservoir of the circuit where the main portion of the liquid to be purified is collected, with the turbulence caused by the suction and return of the pump pressurizing the liquid.

Preferably the trap material should be positioned so as to present a large expanse without impeding the circulation of the liquid, and may be, for example, in the form of a gauze or sheet comprising numerous large apertures and forming a type of sieve.

This invention also provides a device for carrying out the above process.

Such a device is advantageously in the form of a detachable cartridge adapted to be fixed at an appropriate point in the circuit, preferably in the tank where the turbulence is favorable for repeated contact between the trap material and the hydraulic fluid.

BRIEF DESCRIPTION OF THE DRAWINGS

In order that the invention may be more fully understood, reference will now be made, by way of example, to the accompanying drawing, in which:

FIGS. 1 and 2 show in perspective two different configurations of trap material which are usable to chemically fix corrosive ions according to the invention;

FIG. 3 shows an enlarged detail of either of the trap material configurations in FIGS. 1 or 2;

FIG. 4 is a vertical section of a detachable cartridge ready for use and fitted with a trap material according to the invention; and FIG. 5 shows this cartridge in horizontal section, the section shown in FIG. 4 being taken along the line IV—IV.

DETAILED DESCRIPTION OF THE DRAWINGS

In FIG. 1 there is shown a useful configuration of trap material for corrosive ions according to the invention. The trap material is in the form of a spirally-coiled band 1, and it is in fact composed of a ferrous metal which is easily attacked by chlorine, hydrochloric acid or fluorine, but which is at the same time insoluble in the active liquid in the hydraulic control circuit.

In the configuration according to FIG. 2, the band 1 is in the form of a pleated tube.

The surface of the ferrous metal in contact with the liquid plays a large part in producing a rapid action. It should be as large as possible within the limits of size imposed by the need to accommodate it in a hydraulic control circuit, particularly in a tank.

In its developed state, the band can have, for example, a length of 500 mm and a width of 100 mm.

The trap material forming the band can be in the form of a grid or sieve, as is shown in FIG. 3, so that the liquid flowing, for example, along the axis of the trap material can pass through it without undergoing any significant resistance. By way of a non-limiting example, the trap material may be in the form of a wire mesh, the wire being made of bare steel annealed to grade A 42, can have a diameter of 240 microns and be woven so as to form a 450 micron mesh.

FIGS. 4 and 5 show a practical embodiment making use of the trap material according to FIG. 2.

The pleated sieve 1 of trap material is fixed by means of an araldite type of resin to cups 2 and 3 which are themselves fixed to a framework 7 made of a light alloy. The parts 5 and 6 of this framework are provided with axial apertures 8 and 9 so that the liquid to be purified can circulate freely, flowing for example through the openings 8 and 9 and passing through the sieve 1 to the outside of the cartridge or vice versa. Flexible hooks 10 an 11 are attached to the framework and are used for fixing the cartridge onto a rod 12 by means of a gripping action. It should be noted that the framework 7 is curved in the shape of a U so as to be freely open on three sides to facilitate the circulation of the liquid in which the cartridge is immersed. The dimensions of the cartridge are suitable for it to be placed in the feed and return tank of the hydraulic circuit, and the rod 12 can simply be the return tube for the liquid.

The sieve should be very clean and completely cleared of any deposit at the time of its assembly in the circuit, the ferrous metal being completely bare.

After a certain amount of time, the metal being attacked by the corrosive ions takes on a rust-coloured deposit formed by the fixation of the corrosive ions. It has been established that this deposit contains iron hydrate at the expense of the water which is present in the hydraulic liquid and which moreover contributes deterimentally to the agressivity of the corrosive products, in particular the hydrochloric acid.

This deposit makes the sieve passive and the cartridge has to then be replaced by a new cartridge.

Before being used, it is advantageous if the clean cartridges are kept in closed boxes filled with pure hydraulic fluid, so that the ferrous metal of the sieve retains a bright, effective surface.

I claim:

1. A process for automatically purifying the active liquid in a closed loop hydraulic control circuit by removing contaminent ions and corrosive products produced therein during operation of the closed loop hydraulic control circuit, said process comprising the steps of providing a band of solid state trap material which is insoluble in said active liquid and is chemically reactive with the contaminent ions and corrosive products in said active liquid so as to chemically fix them on the surface thereof, providing an opening in said closed loop hydraulic control circuit, moving said band of solid state trap material through said opening and into said closed loop hydraulic control circuit so as to become immersed in the active liquid therein, closing said opening, and causing said active liquid to flow in said closed loop hydraulic control circuit and past said band of solid state trap material, such that said contaminent ions and corrosive products in the active liquid flowing past said band of solid state trap material will become chemically fixed on the surface thereof.

2. A process as defined in claim 1 wherein said closed loop hydraulic control circuit includes a feed/return tank and wherein said opening is made in said closed loop hydraulic control circuit such that said solid state trap material is placed in the active liquid contained in said feed/return tank.

3. A process as defined in claim 1 wherein said solid state trap material consists of a corrodible-grade alloy of iron.

4. The process as defined in claim 3 wherein said solid state trap material is in the form of a sieve, the sieve having pores sufficiently large that the active liquid can flow freely therethrough.

5. The process as defined in claim 4 wherein said sieve is formed into a spiral coil.

6. The process as defined in claim 4 wherein said sieve is formed into a pleated tube.

* * * * *